United States Patent [19]

Pries

[11] 4,004,983
[45] Jan. 25, 1977

[54] COKE OVEN BATTERY

[75] Inventor: Erich Pries, Bochum, Germany

[73] Assignee: Dr. C. Otto & Comp. G.m.b.H., Bochum, Germany

[22] Filed: Mar. 28, 1975

[21] Appl. No.: 562,814

[30] Foreign Application Priority Data

Apr. 4, 1974  Germany .......................... 2416434

[52] U.S. Cl. .............................................. 202/142
[51] Int. Cl.² ...................... C10B 5/12; C10B 5/14; C10B 5/16
[58] Field of Search ............................ 202/138–144

[56] References Cited

UNITED STATES PATENTS

| 1,961,265 | 6/1934 | Van Ackeren | 202/141 |
| 1,967,975 | 7/1934 | Schaefer | 202/143 |
| 3,252,872 | 5/1966 | Grumm | 202/144 |

*Primary Examiner*—Norman Yudkoff
*Assistant Examiner*—Dale Lovercheck
*Attorney, Agent, or Firm*—Brown, Murray Flick & Peckham

[57] ABSTRACT

The heating walls for a battery of coke oven chambers are formed by rows of twin heating flues. Each heating flue includes a crosswall having an internal passageway with exit ports at graduated elevation to form a header flue. The header flues in two adjacent heating walls are connected by a first series of ducts to regenerators that supply preheated air during the heating half-cycle. A second series of ducts extend between other regenerators and exit ports on the sole of the heating flues for conducting preheated lean gas or, optionally, preheated air when heating with rich gas. The ducts of each series alternate from heating wall to heating wall so that the sequence of upgoing and downgoing flues alternates from heating wall to heating wall. In the middle of a heating wall, a flue crosswall has two header flues with exit ports at opposite sides whereby the upgoing flue of each twin flue is located toward the middle of the heating wall during one regenerative half-cycle and toward the ends of the coke oven chamber during the other regenerative half-cycle.

3 Claims, 4 Drawing Figures

COKE OVEN BATTERY

BACKGROUND OF THE INVENTION

This invention relates to a coke oven battery that is optionally heated by lean gas or rich gas by means of twin flues disposed in a row between the oven chambers. More particularly, the present invention relates to a method and apparatus for reducing the emission of nitrogen oxide in smoke gas from such a battery of coke ovens while at the same time providing an improved regenerative heating system coupled to the twin flues by ducts that have a particularly low flow resistance to the media passing between the regenerators and the heating flues.

The present invention seeks to meet several requirements dealing with the heating of a coke oven battery wherein the oven chambers are supplied with heat from twin flues that are coupled with regenerators for preheating the gaseous combustion media and for storing the sensible heat from the burnt gases. The interconnection between the regenerators and the twin flues should be constructed in a manner to minimize the total flow resistance of the regenerative heating system by providing the shortest flow distance for the gaseous media and the simplest possible shape for the breaks which form the interconnecting ducts. In recent times, there has been a demand in the industry to minimize the amount of nitrogen oxides in burnt gases which are discharged to the atmosphere by a battery of coke ovens.

It is presently known in the art that especially hot parts of a heating system where atmospheric oxygen is not immediately combined with gases to be burned, should not be contacted by an excess of combustion air containing nitrogen. What this means is that where practical, the heating flues are at least partially operated with an excess of gas. That is limited to the extent that a certain amount of excess air must always be used in order to insure complete combustion of the gas.

SUMMARY OF THE INVENTION

It is an object of the present invention to construct a coke oven battery which is to be optionally heated with rich gas or lean gas, in such a manner that firstly there is a particularly low flow resistance to a regenerative heating system for the battery and, secondly, that the content of nitrogen oxides in the smoke gas is reduced to the least possible content.

The present invention provides in a coke oven battery of the type heated optionally by lean gas or rich gas and which includes twin heating flues disposed in a row between the coke oven chambers while extending below the coke oven chambers are cross-regenerators each of which is operated over its entire length in the same direction, the twin heating flues being defined by crosswalls incorporating passageways therein that define header flues having exit ports at intervals of graduated elevations, the improvement of which comprises means defining a first series of ducts extending in a gaseous conducting manner between a first regenerator and the header flues of two adjacent rows of twin heating flues for conducting preheated air during the heating half-cycle, such means further defining a second series of ducts extending in a gaseous conducting manner between a second regenerator and exit ports in the bottom of the heating flues forming two adjacent rows thereof for conducting preheated lean gas when heating a coke oven chamber thereby and for conducting preheated air when heating a coke oven chamber with rich gas, the first and second series of ducts being arranged alternatively from row-to-row of heating flues in a manner to alternate the sequence of upgoing and downgoing flues between rows thereof.

According to the present invention, there is provided a method of reducing the emission of nitrogen oxides in smoke gas from a battery of coke ovens, the method including the steps of introducing fuel gas through a port in the sole of an upgoing flue communicating at its upper end with a downgoing flue, the upgoing and downgoing flues forming part of a plurality of twin flues arranged in a row to form a heating wall for a coke oven chamber, and retaining an excess of heating fuel gas in the base of the upgoing flue of the twin flues by feeding at least a part of regeneratively preheated air for combustion into the upgoing heating flue at an elevation substantially above the sole of the upgoing heating flue in such a manner that the oxygen content of the preheated air is combined with the combustion gas under its intensive exothermic action so as to minimize the formation of nitrogen oxides.

Instead of providing header flues in each crosswall, it is also possible according to the present invention to provide a header flue in only every second crosswall. In other words, with a pair of header flues in one crosswall of a twin heating flue, one of the header flues communicates with the regenerator that conducts air during one half-cycle and the other header flue communicates with the regenerator that conducts air in the other half-cycle. Vertically graduated ports for both header flues are situated on opposite sides of a crosswall.

The present invention further provides that a row of twin heating flues is constructed in such a way that a crosswall lying in the approximate middle of the heating wall is provided with two header flues having exit ports which are situated on opposite sides of the crosswall. The remaining crosswalls have only one header flue with discharge ports on the side of the crosswalls facing toward the end of the oven chamber. The heating flues are connected to the regenerators so that the flues of each twin pair which are upgoing during one regenerative half-cycle, are situated toward the middle of the heating wall and in the other regenerative half-cycle, the upgoing flues are situated toward the end of the coke oven chamber.

When the header flues are connected in the aforementioned manner to the regenerators which serve alternatively for preheating air, there will always be an excess of gas at the base of the heating flues. This excess of gas will be retained there until the last proportion of air has been supplied to the uppermost exit port of the header flue. The oxygen contained in the air is, therefore, always able to combine with the constituents of the combustion gas under intensive exothermic action whereas the tendency of the oxygen to combine with nitrogen diminishes. Thus, there is no excess of air present in those parts of the heating flues which are the hottest due to heating and the possibility of forming nitrogen oxides is greatly reduced.

These features and advantages of the present invention as well as others will be more fully understood when the following description is read in light of the accompanying drawings, in which.

Figure 1:
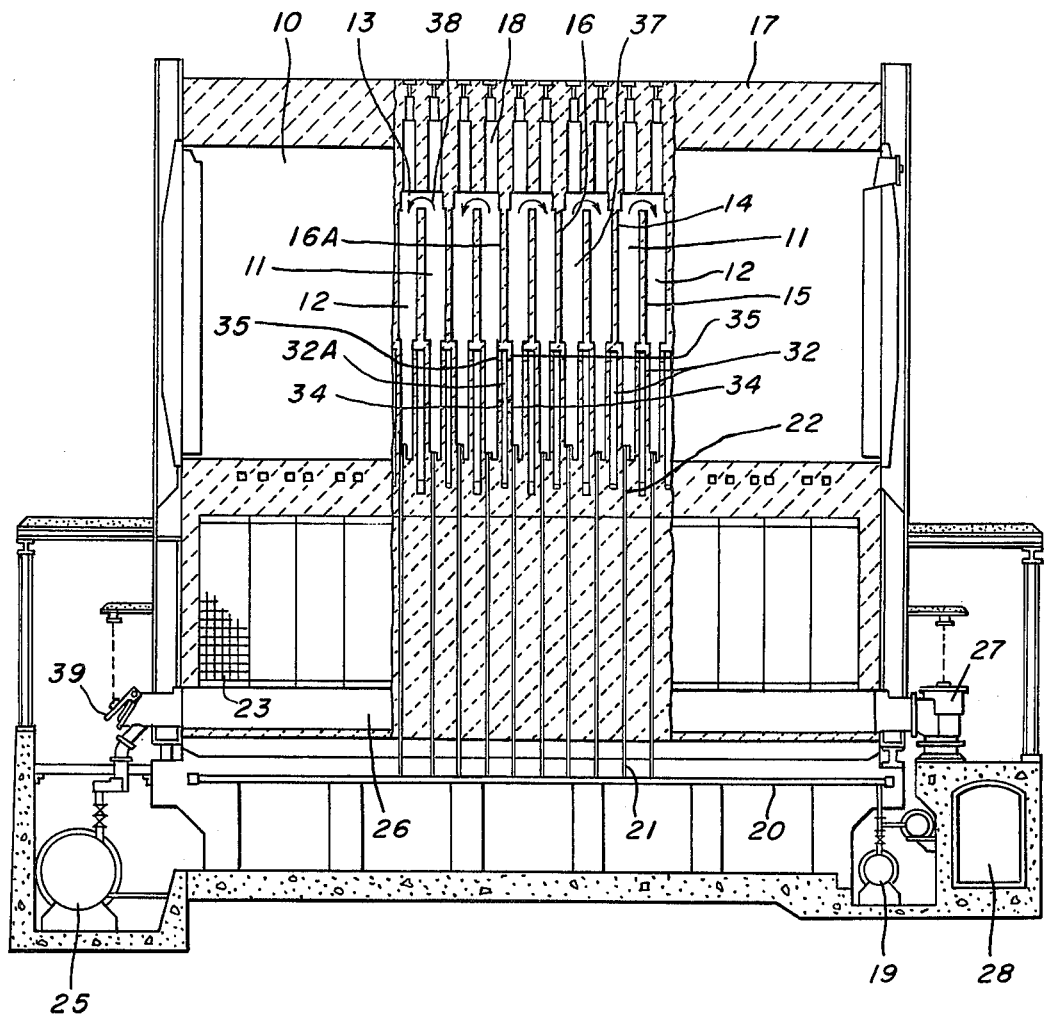
FIG. 1 is an elevational view illustrating different sections through an underjet-type of regeneratively heated coke oven chamber forming one of a battery of coke ovens.
Figure 4:
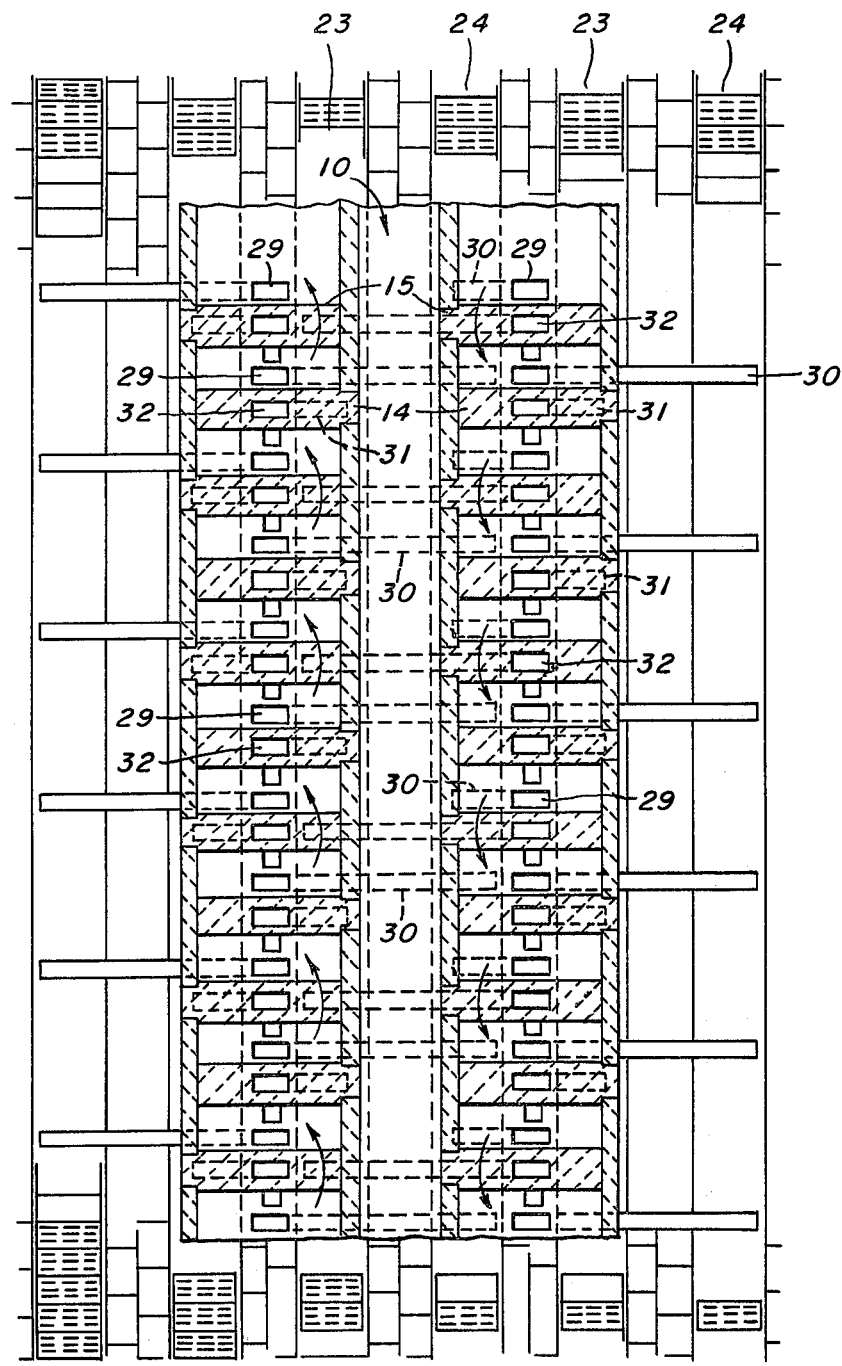
FIG. 4 is a sectional view taken along line IV—IV of FIG. 3.

In FIGS. 1 and 4, there is illustrated one of a plurality of coke oven chambers 10 with side walls that are heated by rows of twin heating flues. The heating flues shown are of the twin-flue type, each consisting of an upgoing heating flue 11 and a downgoing heating flue 12. These flues are formed by continuous crosswalls 14 and discontinuous crosswalls 15. A port 13 at the top of the discontinuous crosswall 15 interconnects the upgoing and downgoing pairs of twin flues. In FIG. 1, arrow 38 indicates the prevailing flow of fuel gases. An inspection aperture 18 in the oven roof provides access to each of the heating flues. Duct 19 extends along the entire length of the battery of coke ovens and supplies rich gas to the heating walls. From duct 19, the rich gas is delivered by jet pipes 20 which extend along the basement below the coke oven chambers from where supply ducts 21 extend through regenerator bulkheads to jets 22 that are disposed in the sole of the heating flues.

Regenerators 23 extend below and along the entire length of each oven chamber. Regenerators 23 are used to preheat combustion air. As clearly shown in FIG. 4, regenerators 24 extend in a parallel relation with regenerators 23 in a manner such that the regenerators 23 and 24 lie below each row of heating flues. The regenerators 24 are used in an alternative manner whereby when heating with lean gas, the regenerators 24 serve to preheat the lean gas and, alternatively, regenerators 24 preheat combustion air, the heating flues are supplied with rich gas. Lean gas is supplied from a distribution duct 25 that extends alongside the entire battery of coke oven chambers. The lean gas is supplied through a valve to sole flues 26 which extend under the regenerators. Combustion air enters the sole flues 26 through flaps 39 that are opened in accordance with the draft changeover. On the other side of the sole flues 26, there is a waste heat valve 27 that controls the flow of smoke gases to a waste heat manifold duct 28.

Figure 2:
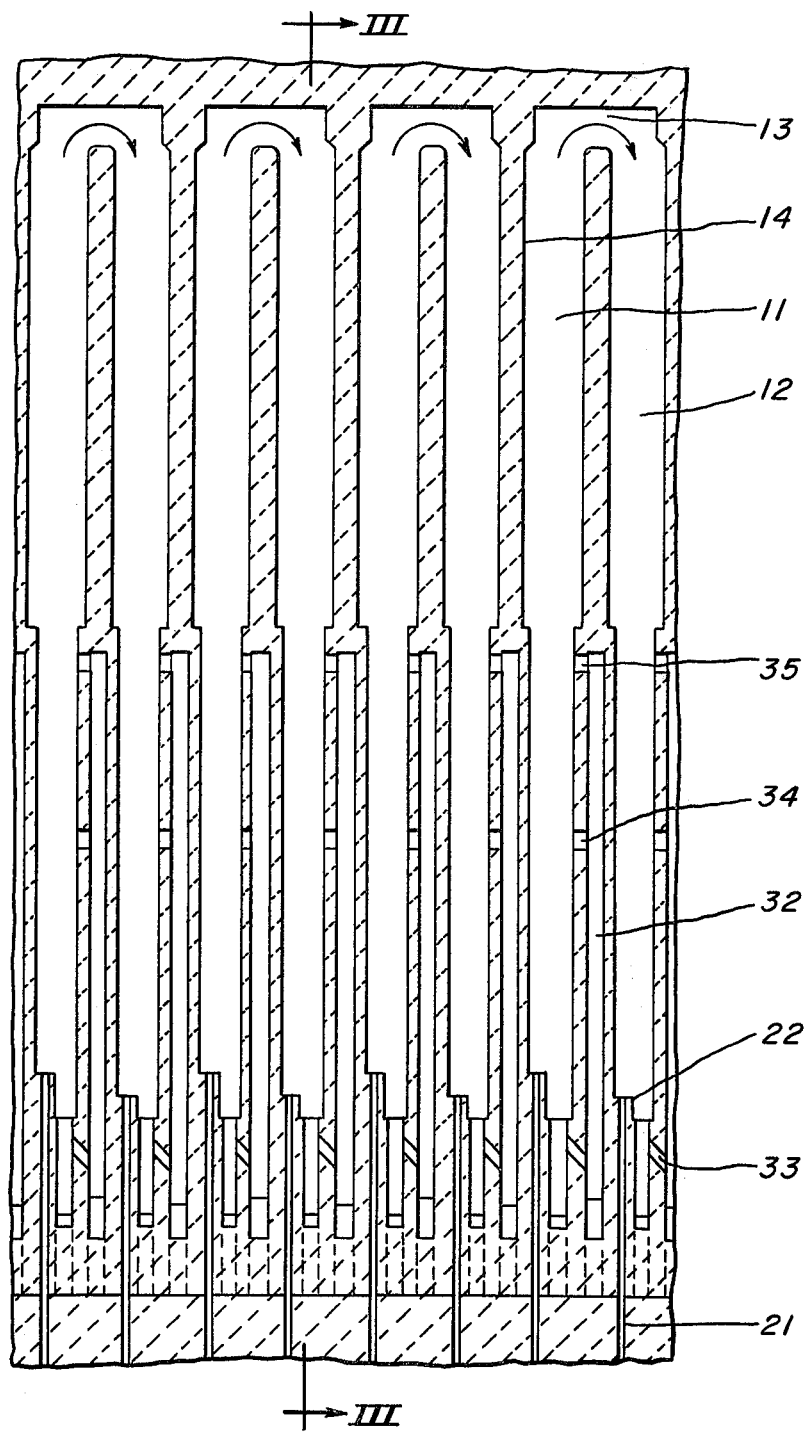
FIG. 2 is an enlarged partial view of the heating flue shown in FIG. 1.
Figure 3:
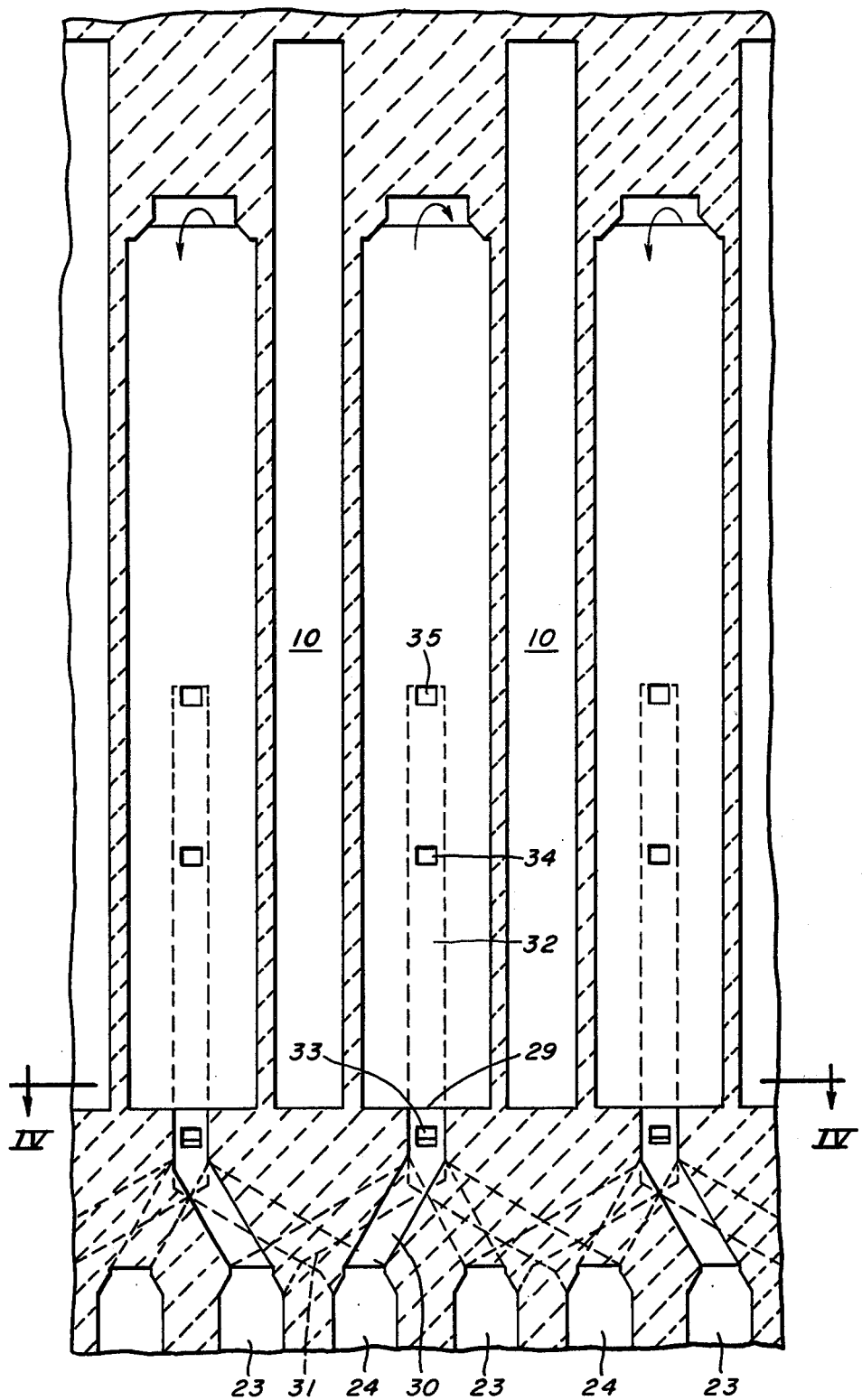
FIG. 3 is a sectional view taken along line III—III of FIG. 2.

FIGS. 3 and 4 illustrate exit ports 29 in the sole of the heating flues. The ports 29 are connected by ducts 30 in a gaseous conducting relation with regenerators 24. The regenerators 23 are connected in a gaseous conducting relation by ducts 31 with header flues 32. Every second header flue is connected to the same regenerator 23 while the remaining header flues are connected by ducts 31 to a different regenerator 23 and receive heated air during the other half-cycle. The header flues 32 take the form of an internal passageway within the crosswalls 14 and 15. As illustrated in FIG. 2, the internal passageway extends to an elevation which is approximately one-half of the height of the heating walls. A supply of air is transferred into the heating flue either through the exit port 33 near the sole of the heating flue or through one of two exit ports 34 and 35 which are situated at different and higher elevational levels. The width of the ports 34 and 35 can be adjusted where appropriate or desired by means of sliding blocks.

In FIG. 1, there is illustrated two rows of heating flues 37 which have a common continuous crosswall 16A situated at the approximate middle portion of the heating wall. The crosswall 16A has two side-by-side header flues 32A including exit ports 33–35 situated on an opposite side of crosswall 32A. When heating with this arrangement of heating flues, the two adjacent twin pairs of flues have a common crosswall 16A whereby the gases flow in the directions shown in FIG. 1. Thus, according to the present invention, the gases flow in the same direction at both sides of crosswall 16A. At the approximate middle of the coke oven chamber, the upgoing flues 11 of each twin pair are situated toward the middle of the row of twin flues while the downgoing flues 12 of the twin flues are situated toward the ends of the coke oven chamber. This pattern of gas flow is, of course, reversed after the regenerative changeover.

Although the invention has been shown in connection with a certain specific embodiment, it wil be readily apparent to those skilled in the art that various changes in form and arrangement of parts may be made to suit requirements without departing from the spirit and scope of the invention.

I claim as my invention:

1. In a coke oven battery of the type heated optionally by lean gas or rich gas and which includes a twin heating flues disposed in a row between the coke oven chambers, the twin heating flues being defined by continuous and discontinuous crosswalls in an alternating arrangement, each heating flue having inlets at its base for rich and lean gas, and cross-regenerators below the coke oven chambers, each of said cross-regenerators being operated over its entire length in the same flow line during a single heating half-cycle and in reverse during the other half-cycle, said twin heating flues being defined by crosswalls incorporating passageways therein that define header flues in each of the crosswalls for preheated air and alternatively as exit ports at intervals of graduated elevations, the improvement comprising:

means defining a first series of ducts extending in a gaseous conducting manner between a first one of said regenerators and every other header flue in each of two adjacent rows of said twin heating flues for conducting preheated air during a heating half-cycle, said means further defining a second series of ducts extending in a gaseous conducting manner between of second of said regenerators and exit ports in the bottom of the heating flues forming said two adjacent rows thereof for conducting preheated lean gas when heating a coke oven chamber thereby and for conducting preheated air when heating a coke oven chamber with rich gas, said first and second series of ducts being arranged alternatively from row-to-row of heating flues in a manner to alternate the sequence of upgoing and downgoing sections of twin flues between rows thereof.

2. The improvement according to claim 1 wherein the first series of ducts communicate by an alternating arrangement thereof with different regenerators such that only every second header flue in one row of heating flues receives heated air during one half-cycle and the remaining header flues in the same row of heating flues receive heated air during the other half-cycle, the exit ports of the header flues being situated on opposite sides of said crosswalls.

3. The improvement according to claim 1 wherein the crosswalls of said twin heating flues within a row thereof are further defined to include a continuous crosswall at the approximate middle of a heating wall for a coke oven chamber, said continuous crosswall having two header flues each with exit ports lying on a different side of the continuous crosswall, the remaining crosswalls at the sides of said continuous crosswall having one header flue with exit ports on the sides facing toward the respective ends of the coke oven chamber whereby the upgoing flue of each twin flue is situated toward the middle of the heating wall during one regenerative half-cycle and toward the ends of the coke oven chamber during the other regenerative half-cycle.

* * * * *